(12) United States Patent
Bell, III et al.

(10) Patent No.: US 6,914,022 B2
(45) Date of Patent: Jul. 5, 2005

(54) REUSABLE SURFACE INSULATION CONTAINING POLYBENZAZOLE

(75) Inventors: Daniel R. Bell, III, Mims, FL (US); Duoc T. Tran, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 84 days.

(21) Appl. No.: 10/295,380

(22) Filed: Nov. 15, 2002

(65) Prior Publication Data

US 2004/0097153 A1 May 20, 2004

(51) Int. Cl.$^7$ .............................. B32B 5/06; D04H 1/08
(52) U.S. Cl. ....................... 442/270; 442/136; 442/172; 442/219; 442/268; 442/274; 442/301; 442/320; 442/324
(58) Field of Search ................................ 442/136, 172, 442/219, 268, 270, 274, 301, 320, 324

(56) References Cited

U.S. PATENT DOCUMENTS

| | | | |
|---|---|---|---|
| 3,764,581 A | * 10/1973 | Zellner et al. ............... | 525/471 |
| 4,151,800 A | 5/1979 | Dotts et al. | |
| 4,359,567 A | 11/1982 | Evers | |
| 4,533,724 A | 8/1985 | Wolfe et al. | |
| 4,578,432 A | 3/1986 | Tsai et al. | |
| 5,089,591 A | 2/1992 | Gregory et al. | |
| 5,277,959 A | * 1/1994 | Kourtides et al. .......... | 428/116 |
| 5,296,288 A | 3/1994 | Kourtides et al. | |
| 5,780,152 A | 7/1998 | Ichiryu et al. | |
| 5,863,390 A | * 1/1999 | Matsuno ................... | 162/358.2 |

OTHER PUBLICATIONS

Demetrius Kourtides, Carol Carroll, Mike Guzinski, Jochen Marschall, Joan Pallix, Jerry Ridge, Dane Smith, and Duoc Tran; Evaluation Of Thermal Control Coatings for Flexible Ceramic Thermal Protection Systems; NASA Technical Memorandum 112199; Jul., 1997; 15 pgs.; National Aeronautics and Space Administration, Ames Research Center, Moffett Field, California.

* cited by examiner

Primary Examiner—Norca L. Torres
(74) Attorney, Agent, or Firm—Alston & Bird LLP

(57) ABSTRACT

A lightweight, flexible, layered insulation composed of glass or ceramic fabric covered with a ceramic coating and overlying an insulating felt made from needled polybenzazole (PBZ) material which is preferably polybenzoxazole (PBO), and which optionally contains a poly(1,3-phenylene isophtalamide) felt material, commercially known as Nomex™, either combined with the PBZ felt or layered beneath the PBZ felt as a separate layer. The insulation is readily applied to a reusable launch vehicle via a silicone adhesive.

14 Claims, 2 Drawing Sheets

REUSABLE SURFACE INSULATION CONTAINING POLYBENZAZOLE

FIELD OF THE INVENTION

The invention relates to a reusable thermal insulation for use with a thermal protection system of a reusable launch vehicle. More particularly, the invention relates to flexible thermal insulation which may be applied to the surface of a reusable launch vehicle.

BACKGROUND OF THE INVENTION

The Shuttle Orbiter, the only operational Reusable Launch Vehicle (RLV), is protected during ascent and reentry by lightweight, low thermal conductivity rigid and flexible thermal protection systems (TPS). The Shuttle Orbiter currently uses various thermal protection systems to mitigate aerothermal heating encountered during ascent/reentry. At high temperatures (up to 1500° F.) quilted ceramic blankets are used for thermal protection. At extreme temperatures, (up to 3000° F.) rigid ceramic materials such as porous silica tile and carbon-carbon materials provide protection against thermal bum-through. For low temperature uses (up to 750° F.) felt batting systems such as the Flexible Reusable Surface Insulation (FRSI) system are used. The FRSI system consists of Nomex™ batting needled into a large felt-type pad/sheet and coated with a protective silicone topcoat. The coated pad is used on the Shuttle Orbiter in areas that have limited thermal requirements, i.e., areas that have relatively low aerothermal heating (up to 750° F.). The advantage of the FRSI system is that it can be easily installed in large part sizes onto the vehicle because of its flexible needled-felt construction.

The robust nature, simple design, and conformability of the current FRSI system make it well suited for extensive use since it can easily withstand acoustic loading and provide a smooth continuous aerodynamic surface. However, the inherent material properties of the Nomex™ batting and silicone coating that compose FRSI limit the temperature capability of this product to areas that remain below 750° F. such as the top surface of the fuselage and the upper surfaces of the wings. This limitation in thermal stability is unfortunate since its simplicity in design, low cost, low maintenance, and ease in installation make FRSI an excellent candidate for more extensive use if the upper temperature limit were raised.

While other non-FRSI thermal protection systems are used at present to manage the thermal requirements over the higher temperature areas of the Orbiter vehicle during ascent and reentry, these other systems are more expensive relative to FRSI in terms of installation, maintenance, and replacement. Furthermore, the simplicity in design of FRSI allows it to be easily cut to accommodate any size or shape, whereas other thermal protection systems must be custom fabricated, which results in higher manufacturing costs. What is needed is an insulating material exhibiting the ease of manufacture and ease of installation associated with FRSI while exhibiting improved thermal insulating characteristics.

SUMMARY OF THE INVENTION

The invention is a layered insulation composed of glass or ceramic fabric covered with a ceramic coating overlying an insulating felt made from needled polybenzazole (PBZ) material which is preferably polybenzoxazole (PBO), and which optionally contains a poly(1,3-phenylene isophtalamide) felt material, commercially known as Nomex™ fiber, either combined with the PBZ felt or layered beneath the PBZ felt as a separate layer.

The outer mold line (OML) of the insulation is composed of protective ceramic fabric covered with a ceramic coating material designed to withstand elevated temperatures. The ceramic protective layer of high-temperature glass or ceramic fabric and the ceramic coating provide exceptional thermal protection and efficiently reduce the back-face or transmitted temperature to the underlying PBZ felt.

The PBZ felt is made up of PBZ fibers that are entangled in a needling process to form a cohesive felt. The needling process provides structural support via entanglements of the PBZ batting fibers for mechanical peel strength. The PBZ felt itself can withstand higher temperatures than the Nomex™ felt used in previous launch vehicle insulation, while maintaining similar mechanical and thermal properties. Heating is reduced through the PBZ felt as heat migrates from the OML toward the (inner mold line) IML. If a Nomex™ felt layer underlies the PBZ layer, then the insulation is designed such that heat transmitted through the PBZ layer will have been reduced to correspond with the thermal capacity of the Nomex™ layer. If only a PBZ felt layer is used, the insulation is designed such that the heat is reduced to correspond with the thermal capacity of the structure of the vehicle.

The separate layers of the insulation are needle stitched together to form a cohesive structure. The needling process uses barbed needles that are pushed through the fibrous batting, forcing fibers to entangle within and between the layers of material, thus "stitching" through the entire construction. The outer ceramic or glass fabric is needle-stitched to the PBZ batting, thus entangling PBZ felt fibers within the woven fabric yams. For increased durability, the ceramic coating may be used as a bonding agent to mechanically lock the glass fabric and the PBZ batting fibers together. Furthermore, the ceramic coating acts as an effective thermal barrier to thermally insulate the PBZ batting against hot gas penetration, and provide added protection from other penetrating environmental conditions.

The insulation provides improved thermal protection over previous lightweight flexible insulations, such as FRSI. Thus, the insulation is capable of providing thermal protection at temperatures exceeding the 750° F. limit of FRSI. The insulation provides improved insulating characteristics, yet the insulation may be installed on reusable launch vehicles according to currently established methods for FRSI installation, thereby being simpler to install than the other thermal protection systems.

BRIEF DESCRIPTION OF THE DRAWINGS

Figure 1:
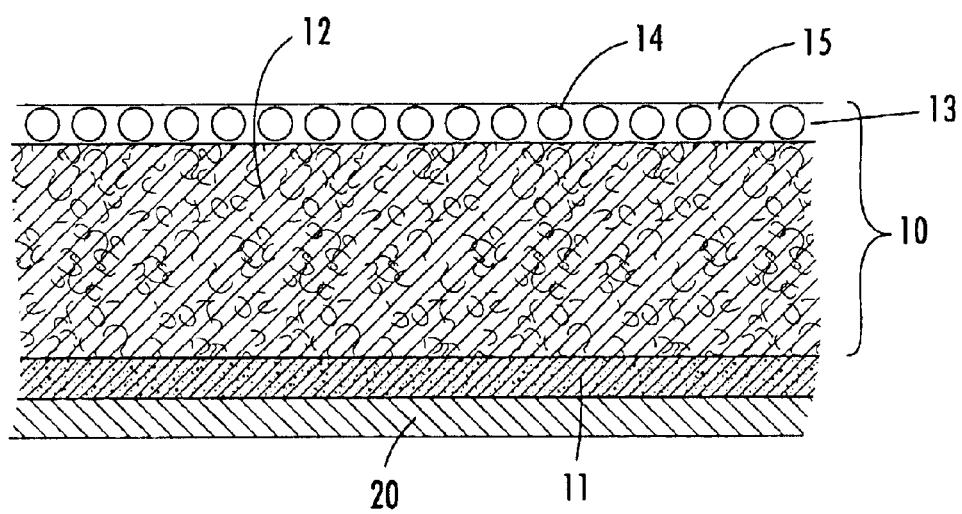
Figure 2:
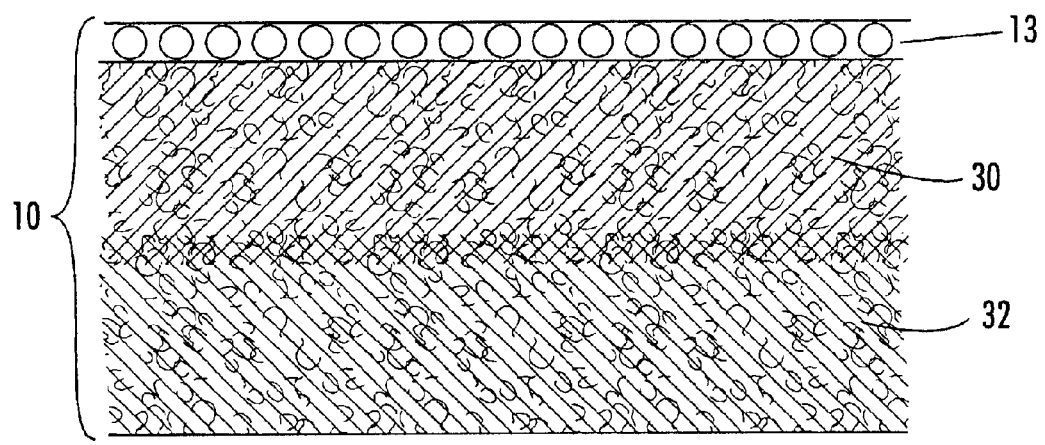
Figure 3:
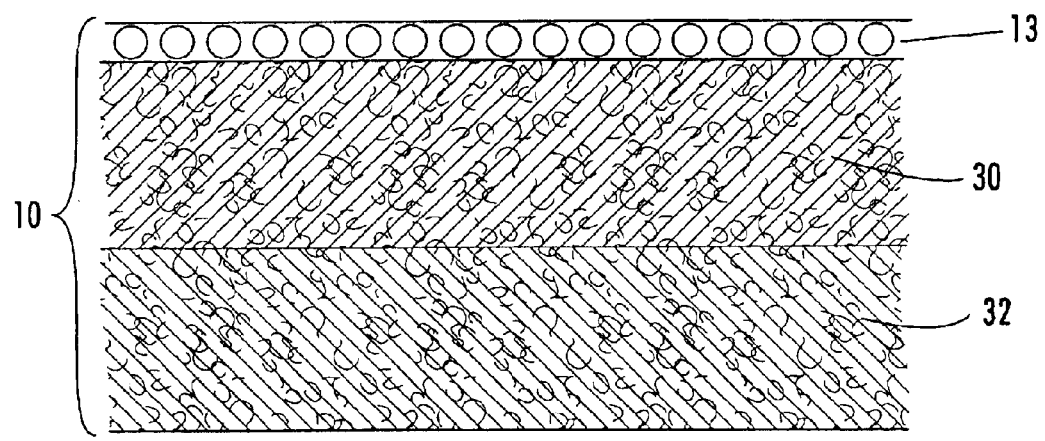
Figure 4:
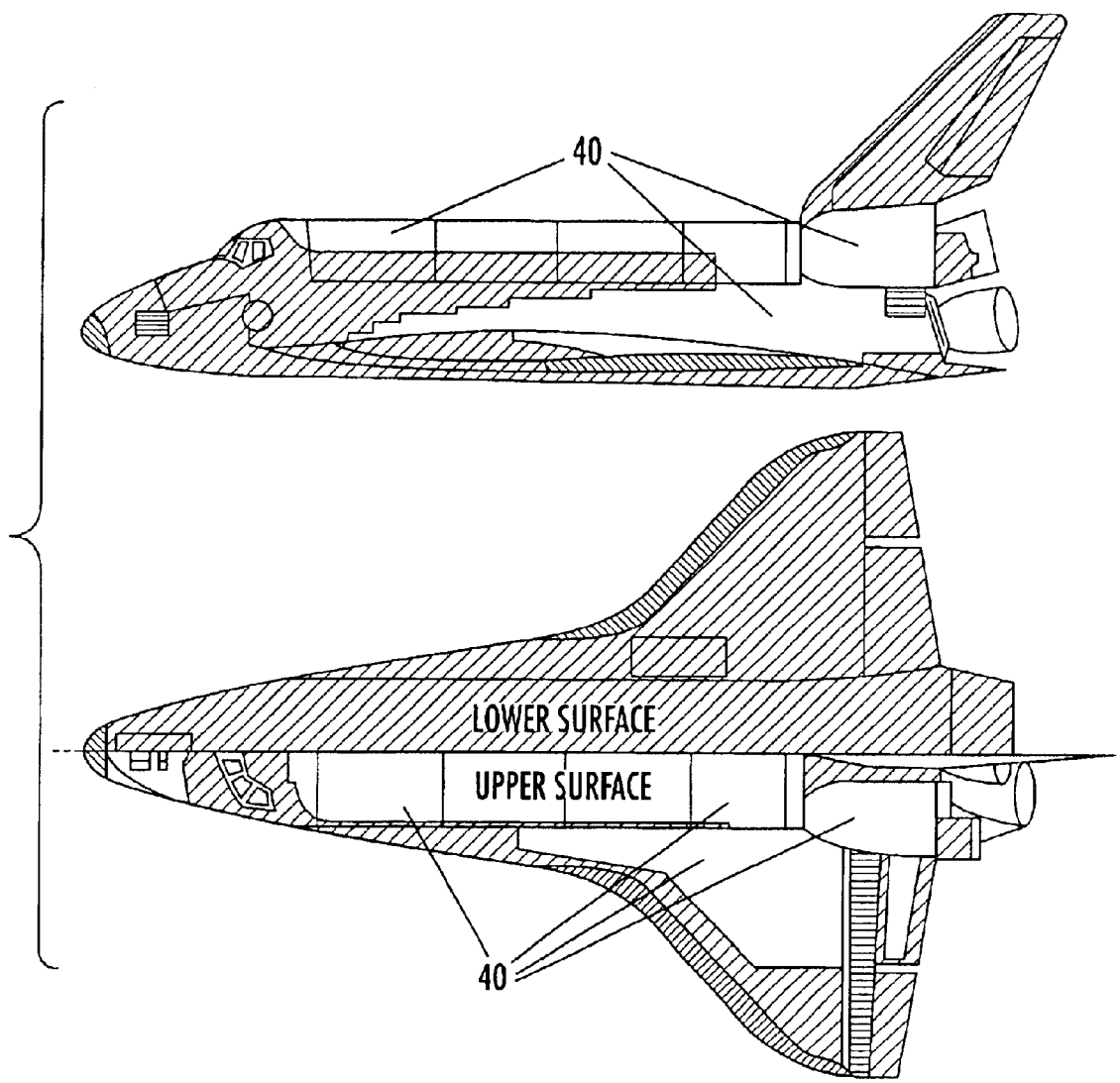

Having thus described the invention in general terms, reference will now be made to the accompanying drawings, which are not necessarily drawn to scale, and wherein:

FIG. 1 is a side cutaway view of an embodiment of the invented insulation,

FIG. 2 is a side cutaway view of insulating felt according to an embodiment of the invention, FIG. 3 is a side cutaway view of insulating felt according to an alternative embodiment of the invention, and FIG. 4 is a side/top/bottom view of a Space Shuttle Orbiter indicating proposed regions for use of the invented insulation.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will filly convey the scope of the invention to those skilled in the art. Like numbers refer to like elements throughout.

Referring now to FIG. 1, the invented insulation 10 comprises a felt pad 12 of polybenzazole fiber or a combination of polybenzazole and Nomex™ fibers, which is laminated to a coated ceramic fabric layer 13 along the outer mold line surface of the felt 12. The insulation 10 may be attached to the surface of a vehicle 20, such as the Space Shuttle, via a layer of adhesive 11 between the inner mold line surface of the felt and the surface of the vehicle.

The polybenzazole or combination of polybenzazole and Nomex™ fibers are temperature resistant, flexible filaments randomly oriented and closely arranged with respect to each other and are needled to form a needled felt configuration similar to previous FRSI insulation materials. The felt pad 12 is between 0.14 inch and 0.40 inch in thickness, depending on the insulative capacity needed for a particular application. The unit weights for felt ranging from 0.144 inch to 0.176 inch in thickness are from 14.5 oz/yd$^2$ to 22.5 oz/yd$^2$, and for felt ranging from 0.30 inch to 0.34 in thickness are from 27.5 oz/yd$^2$ to 37.5 oz/yd$^2$.

The term "polybenzazole fiber" as used herein refers to various fibers made of polybenzazole (PBZ) polymers. Examples of the polybenzazole (PBZ) polymer include polybenzoxazole (PBO) and polybenzothiazole (PBT) homopolymers, as well as random, sequential or block copolymers of their monomer components.

The polybenzoxazole and polybenzothiazole, as well as random, sequential or block copolymers of their monomer components, are disclosed in, for example, U.S. Pat. Nos. 4,703,103; 4,533,692; 4,533,724; 4,533,693; 4,359,567; and 4,578,432. The PBZ polymers are lyotropic liquid crystal polymers which are composed of homopolymers or copolymers containing, as the main base unit, at least one selected from the units depicted by the structural formulas (a) to (h):

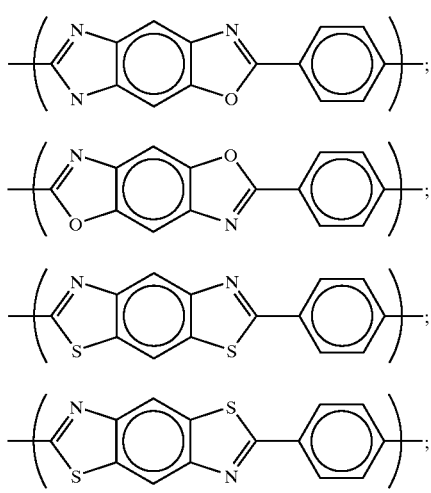

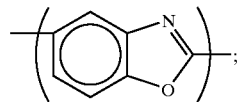

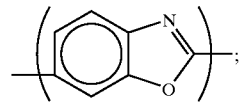

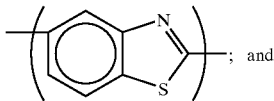

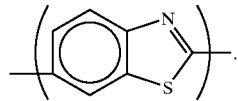

The PBZ polymers and copolymers can be produced by any of the known methods, such as disclosed in U.S. Pat. No. 5,089,591. The PBZ polymers and copolymers may be made into polybenzazole fibers with high temperature resistance, high tensile strength, and high tensile modulus by known methods such as that shown in U.S. Pat. No. 5,294,390.

A preferred PBZ fiber for use in the felt 12 is PBO, and a particularly preferred fiber for use in the felt 12 is a PBO fiber cut to a length of 25 to 100 mm. Because PBO is a particularly preferred fiber for use in the insulation, PBO is used throughout the specification for exemplary purposes, though it is noted that the described process and compositions are equally applicable to PBZ fibers, in general.

In addition to PBZ fibers, the felt layer 12 may comprise Nomex™ fiber, a poly(1,3-phenylene iso phthalamide) commercially available from the DuPont Company. The Nomex™ fiber is needled into a felt material as in Flexible Reusable Surface Insulation (FRSI) as described in U.S. Pat. No. 4,151,800. Referring to FIG. 2, the PBO 30 and Nomex™ fiber 32 may be combined such that the different fibers form a gradient from Nomex™ 32 at the inner mold line face of the felt 12 to PBO 30 at the outer mold line face of the felt 12. Referring to FIG. 3, the PBO 30 and Nomex™ fiber 32 may be combined such that the different fibers form layers, with the Nomex™ 32 positioned adjacent the inner mold line surface of the felt and the PBO 30 positioned adjacent the outer mold line surface of the felt. If the PBO 30 and Nomex™ 32 layers of the felt are produced separately, the PBO and Nomex™ may be combined by needling the two layers together.

As used herein, "needling" is meant as the process of repeatedly projecting one or more barbed needles through a material such that fibers of the material, or multiple materials being needled together, are forced to entangle, thus creating a unitary felt type body from single component materials and thus effectively stitching together multiple component materials.

The felt 12 is pre-heat treated prior to installation upon a vehicle by first exposing the felt to incremental heat treatments which are gradually increased to about 750° F. This eliminates subsequent adverse shrinkage and allows any volatile materials to be driven off.

A layer 13 of coated ceramic fabric is laminated to the outer mold line surface of the felt 12. The coated fabric 13 reradiates heat away from the felt material and provides a smooth aerodynamic surface.

The coated fabric layer 13 is constructed of a base fabric 14 of woven ceramic fibers. The layer 13 preferably has a thickness of between about 0.01 and about 0.06 inches, and most preferably about 0.03 inches. The fibers of the fabric are ceramic and remain physically stable when exposed to extreme temperatures, such as those experienced by a spacecraft upon re-entry into the atmosphere. The fibers are continuous, meaning that most of the fibers span a substantial portion of either the length or width of the woven fabric. Exemplary fabrics are quartz woven fabrics and Nextel™ fabrics. Of the Nextel™ fabrics, Nextel™ 610, Nextel™ 720, and Nextel™ 440 fabrics are preferred, with Nextel™ 440 being particularly preferred due to its lower cost. Quartz woven fabrics are preferably provided with an aluminosilane binder finish. The fiber dimensions of the fabric 14 are not particularly limited, although a fiber diameter of from 3 to 15 μm can generally be employed.

A protective ceramic coating 15 is applied to the fabric layer 14. The coating is preferably applied to the fabric layer 14 in accordance with U.S. Pat. No. 5,296,288, incorporated herein by reference, which describes the application of an admixture of powder $SiO_2$, colloidal $SiO_2$, and an emittance agent.

The method of coating the fiber includes the use of an $SiO_2$ powder component which is commercially available, such as 99.9% $SiO_2$, 325 mesh, from Cerac Corporation, Milwaukee, Wis. The colloidal $SiO_2$ component of the protective coating is a suspension of colloidal $SiO_2$ particles in water, such as that commercially available as Ludox AS, from du Pont Company, Wilmington, Del. Alumina powder and colloidal alumina may also be used. The emittance agent for use in this invention is selected from the group consisting of silicon tetraboride, silicon hexaboride, silicon carbide, molybdenum disilicide, tungsten disilicide and zirconium diboride. The emittance agent for use in this invention preferably is in the form of a powder having a particle size of from 4 to 7 μm. Silicon hexaboride is preferred and an exemplary silicon hexaboride is 98% silicon hexaboride, $SiB_6$, 200 mesh, from Cerac Corporation, Milwaukee, Wis.

An exemplary fiber coating contains $SiO_2$ powder in an amount of from 23.0 to 44.0 wt %, and preferably from 29.0 to 39.0 wt %, colloidal $SiO_2$ in an amount of from 25.0 to 45.0 wt %, and preferably from 29.0 to 40.0 wt %, silicon hexaboride in an amount of from 0.5 to 4.5 wt %, and preferably from 1.5 to 3.5 wt %, water in an amount of from 19.0 to 39.0 wt %, and preferably from 23.0 to 35.0 wt %. The content of each component is given in terms of the total weight of the protective coating.

The protective coating 15 is prepared by first forming a slurry of the components of the protective coating, and then ball milling the slurry to provide a uniform solid dispersion. The slurry is then placed in an appropriate storage container (e.g., pint or quart plastic bottle) and rotated on a Kendall or equivalent mixer until just prior to application onto the fabric 14.

The protective ceramic coating 15 is applied to the ceramic fabric 14, preferably by use of a spray gun. The coated ceramic material is preferably uniformly coated such that all filaments, yarns and threads of the ceramic material are completely covered. A dry coating weight of about 0.02 g/cm² is especially preferred. The surface thickness of the dry coating is preferably from 0.08 to 0.012 mm, and preferably has a uniformity (standard deviation/average thickness) of +/−10%.

The coated fabric layer 13 is needle-stitched to the PBO felt, thus entangling the PBO felt fibers within the woven fabric yarns. For increased durability, the ceramic coating is used as a bonding agent to mechanically lock the ceramic fabric and the PBO felt together. If the ceramic coating is to be used as an adhesive, then ceramic fabric 14 is needled to the PBO felt prior to application of the ceramic coating 15 or after application of the ceramic coating to the ceramic fabric but prior to drying of the coating material. The ceramic coating is typically cured at room temperature for about 4 hours. If multiple coats are used, then the lower layer is typically cured for 4 hours and the top coat is cured for 8 hours or longer at room temperature.

Referring again to FIG. 1, the finished insulation 10 is bonded to the frame of a vehicle 20 with adhesive 11 and cured. The adhesive bonding agent is one such as RTV-560™, which is a silicone rubber compound made by the General Electric Company and has heat resistant characteristics up to 600° F. The thickness of the adhesive 11 is approximately 0.019 cm. The curing is preferably in a vacuum bag for not less than 16 hours at 1.5 to 2.5 pounds per square inch and room temperature.

The invented insulation is flexible and is easily applied to a vehicle. Referring to FIG. 4, the insulation is designed for installation upon the surfaces 40 of a vehicle which experience relatively low temperatures, up to about 925° F. The insulation may be manufactured in various size and thickness, resulting in an insulation which is economical to produce and to install. Since the PBO felt material is heat resistant to a temperature of 925° F., it acts to reduce the temperature through the thickness of the insulation either to an additional Nomex™ layer, which is heat resistant to a temperature of 731° F., or to the vehicle structure, which is heat resistant to a temperature of less than 400° F. The exterior coated ceramic fabric layer of the insulation provides a protective shield for the felt. The spaces between individual fibers of the ceramic fabric allow venting of the insulation.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A flexible layered thermal insulation, comprising:
   a felt comprised at least partially of needled polybenzazole (PBZ) fibers, such felt having an outer mold line (OML) surface and an inner mold line (IML) surface;
   a layer of fabric comprised of ceramic fibers, affixed to the OML surface of the felt; and,
   a ceramic coating applied to the fibers of the fabric layer, wherein the felt comprises PBZ fibers in combination with fibers of poly(1,3-phenylene isophtalamide) and wherein the felt has a higher percentage of PBZ fibers in the region adjacent the OML surface of the felt than the region adjacent the IML surface of the felt.

2. The insulation of claim 1, wherein the PBZ fiber is selected from polybenzoxazole (PBO) and polybenzothiazole (PBT).

3. The insulation of claim 1, wherein the felt comprises a unitary layer of needled fibers, and wherein the composition profile of the felt is a gradient from the IML surface to the OML surface.

4. The insulation of claim 1, wherein the felt is constructed of a layer of needled poly(1,3-phenylene isophtalamide) fibers joined by needling to a layer of needled PBZ fibers.

5. The insulation of claim 1, wherein the basis weight of the felt is 14.5 oz/yd$^2$ to 37.5 oz/yd$^2$.

6. The insulation of claim 1, wherein the fabric layer is comprised of fiber selected from the group consisting of quartz, 1,3-phenylene isophthalamide, and combinations thereof.

7. The insulation of claim 1, wherein the ceramic coating is derived from an admixture of silica powder, colloidal silica, and an emittance agent.

8. The insulation of claim 7, wherein the emittance agent is selected from the group consisting of silicon tetraboride, silicon hexaboride, silicon carbide, molybdenum disilicide, tungsten disilicide and zirconium diboride.

9. A reusable thermal insulation attached to the surface of a vehicle, the insulation comprising
  a felt comprised at least partially of needled polybenzazole (PBZ) fibers, such felt having an outer mold line (OML) surface and an inner mold line (IML) surface;
  a layer of fabric comprised of ceramic fibers, affixed to the OML surface of the felt; and
  a ceramic coating applied to the fibers of the fabric layer;
  wherein the felt comprises PBZ fibers in combination with fibers of poly(1,3-phenylene isophthalamide) and wherein the felt has a higher percentage of PBZ fibers in the region adjacent the OML surface of the felt than the region adjacent the IML surface of the felt; and,
  wherein the insulation is adhered to the surface of the vehicle with an adhesive bonding agent.

10. The insulation attached to a vehicle of claim 9, wherein the adhesive bonding agent is a silicone adhesive.

11. A flexible layered thermal insulation, comprising:
  A felt comprised at least partially of needled polybenzazole (PBZ) fibers, such felt having an outer mold line (OML) surface and an inner mold line (IML) surface;
  a layer of fabric comprised of ceramic fibers, affixed to the OML surface of the felt; and
  a ceramic coating applied to the fibers of the fabric layer,
  wherein the layer of fabric is affixed to the OML surface of the felt by needling the felt and the fabric together thereby entangling the fibers of the felt with the ceramic fibers of the fabric.

12. The insulation of claim 11, wherein the ceramic coating also forms an adhesive bond between the ceramic fibers of the fabric layer and the needled fibers of the felt.

13. A reusable thermal insulation attached to the surface of a vehicle, the insulation comprising:
  a felt comprised at least partially of needled polybenzazole (PBZ) fibers, such felt having an outer mold line (OML) surface and an inner mold line (IML) surface;
  a layer of fabric comprised of ceramic fibers, affixed to the OML surface of the felt; and
  a ceramic coating applied to the fibers of the fabric layer,
  wherein the layer of fabric is affixed to the OML surface of the felt by needling the felt and the fabric together thereby entangling the fibers of the felt with the ceramic fibers of the fabric; and,
  wherein the insulation is adhered to the surface of the vehicle with an adhesive bonding agent.

14. The insulation attached to a vehicle of claim 13, wherein the adhesive bonding agent is a silicone adhesive.

* * * * *